United States Patent [19]

Yamamoto et al.

[11] Patent Number: 5,502,011
[45] Date of Patent: *Mar. 26, 1996

[54] SILICON NITRIDE SINTERED BODY

[75] Inventors: Takehisa Yamamoto; Takao Nishioka; Kenji Matsunuma; Akira Yamakawa, all of Hyogo, Japan

[73] Assignee: Sumitomo Electric Industries, Ltd., Japan

[*] Notice: The term of this patent shall not extend beyond the expiration date of Pat. No. 5,204,297.

[21] Appl. No.: 303,591

[22] Filed: Sep. 9, 1994

Related U.S. Application Data

[63] Continuation of Ser. No. 969,238, Jan. 13, 1993, abandoned.

[30] Foreign Application Priority Data

Oct. 21, 1991 [JP] Japan ............... 3-272635

[51] Int. Cl.⁶ ............... C04B 35/587; C04B 35/599
[52] U.S. Cl. ............... 501/97; 501/98
[58] Field of Search ............... 501/97, 98

[56] References Cited

U.S. PATENT DOCUMENTS

| | | | |
|---|---|---|---|
| 4,978,645 | 12/1990 | Ukyo et al. | 501/98 |
| 5,015,608 | 5/1991 | Matsuhisa et al. | 501/98 X |
| 5,093,290 | 3/1992 | Furukawa et al. | 501/98 X |
| 5,120,682 | 6/1992 | Ukyo et al. | 501/98 X |
| 5,204,297 | 4/1993 | Yamamoto et al. | 501/98 X |
| 5,234,642 | 8/1993 | Nishioka et al. | 501/98 X |
| 5,328,876 | 7/1994 | Nishioka et al. | 501/98 X |

FOREIGN PATENT DOCUMENTS

| | | |
|---|---|---|
| 514622 | 11/1992 | European Pat. Off. . |
| 182276 | 10/1984 | Japan . |
| 2-233560 | 9/1990 | Japan . |
| 199169 | 8/1991 | Japan . |

OTHER PUBLICATIONS

Chemical Abstracts, vol. 114, No. 24, Abstract 233516k, Mashimo et al, "Yielding Characteristics of Silicon Nitride Ceramics Under Shock Compression", (1990).

Primary Examiner—Karl Group
Attorney, Agent, or Firm—Jordan B. Bierman; Bierman and Muserlian

[57] ABSTRACT

A silicon nitride sintered body characterized by comprising crystal grains having a linear density of 60 to 120 per 50 μm length as measured in an arbitrary two-dimensional section of the sintered body. The silicon nitride sintered body has a shock compressive elasticity limit (Hugoniot-elastic limit) of 15 GPa or more and is substantially composed of crystal phases of α-silicon nitride and β'-sialon. The percentages of the α-silicon nitride and β'-sialon are not more than 30% and not less than 70%, respectively. The silicon nitride sintered body is particularly excellent in mechanical strengths at room temperature as well as in productivity and cost efficiency and is useful for applications as the material of parts where a particularly high impact strength is required, such as a valve train mechanism for automobile parts.

2 Claims, 3 Drawing Sheets

SILICON NITRIDE SINTERED BODY

This application is a continuation of application Ser. No. 07/969,238, filed Jan. 13, 1993, now abandoned.

TECHNICAL FIELD

The present invention relates to a silicon nitride sintered body which is particularly excellent in mechanical strengths at room temperature and is also excellent in productivity and cost efficiency and in impact strength sufficient for use in applications as the material of parts where a particularly high impact strength is required, such as a valve train mechanism for automobile parts.

BACKGROUND ART

Various research and development have hitherto been conducted on a sintering process, sintering aids, a limitation on the crystal phase to be involved, etc., for the purpose of improving the strength of silicon nitride material. For example, regarding the sintering process, a bending strength of about 100 kg/mm$^2$ has been realized in a hot press sintering process as described in Am. Ceram. Soc. Bull., 52 (1973) pp. 560. Further, a hot isostatic pressing process (HIP process) wherein use is made of a glass capsule has also been developed.

Although these techniques can provide excellent properties in respect of the strength of the sintered body, they are not advantageous in respect of the productivity and cost efficiency. In order to solve this problem, a gas pressure sintering process [see, for example, Mitomo, "Funtai to Kogyo" Vol 12 No. 12, pp. 27 (1989)] has been proposed in the art. In this process, since the densification of a final sintered body is accompanied by the grain growth of a β-silicon nitride crystal, there is a high possibility that the strength might be deteriorated due to the precipitation of coarse crystal grains. Further, since sintering is conducted under a nitrogen gas pressure of 10 atm or more, as with the hot press process and HIP process, the size of necessary sintering equipment becomes large. Therefore, this process has not been regarded as a satisfactory technique in respect of the properties and productivity. On the other hand, regarding a sintering aid, an $Si_3N_4$-$Al_2O_3$-$Y_2O_3$-based silicon nitride sintered body, wherein $Y_2O_3$ is used as a main aid, is disclosed in Japanese Patent Publication Nos. 21091/1974 and 38488/1973. As described in the specifications of these publications, it is thought that the crystal grain of β-silicon nitride forms a fibrous structure in the sintered body, which is dispersed in the matrix, thus contributing to an improvement in the strength and toughness. Specifically, this technique positively utilizes a phenomenon that since the crystal form of B-silicon nitride is hexagonal, the crystal anisotropically grows in the direction of C-axis. In particular, as described in the Japanese Patent Publication No. 38448/1973 and Journal of Ceramic Society of Japan, Vol. 94, pp. 96 (1986), in some cases, fibrous β-silicon nitride crystal grain grows into a size of ten-odd μm or more in the direction of C-axis. In this technique, however, there is a possibility that the growth of the grain might lead to abnormal growth or occurrence of pores, which in turn gives rise to a deterioration in the strength. Further, in this process wherein use is made of a sintering aid, no satisfactory densification can be attained without raising the sintering temperature to 1700° to 1900° C., and when sintering is conducted under a nitrogen gas pressure around atmospheric pressure, sublimation and decomposition of silicon nitride occur, so that no stable sintered body can be produced in some cases. For this reason, the above process has not been regarded excellent in respect of both the properties of the sintered body and the productivity. In all the above-described techniques, the strength of the resultant sintered body is about 100 kg/mm$^2$ at the highest in terms of the three-point bending strength according to JIS R 1601, and the properties are not always satisfactory when various applications of silicon nitride materials are taken into consideration.

Examples of the application of the ceramic material to automobile parts include applications to an impeller of a turbo charger [(see, Shibata, Hattori and Kawamura, "New Ceramics Journal", No. 1, pp. 91 (1988)] and a tappet shim for a diesel engine [see Hara, Kobayashi, Matsui and Akabane, "Jidosha Gijutsu" Vol 45 No 4 pp 33 (1991)]. All of these examples utilize the properties of the silicon nitride ceramics, such as weight reduction and abrasion resistance. When the silicon nitride ceramics are utilized as valve train materials or mechanical parts, there occurs a problem of a reliability under the present conditions. In particular, the development of a silicon nitride material excellent in the abrasion resistance as well as in the impact resistance has been desired in the art because when parts such as a tappet shim are used in a usual reciprocating engine, a very high impact stress occurs in an unstationary operating condition (for example, surging phenomenon).

An object of the present invention is to provide a technique capable of satisfying both requirements for productivity and mechanical properties of the sintered body unattainable in the above-described prior art.

DISCLOSURE OF THE INVENTION

The present invention has been made based on a finding that a silicon nitride sintered body characterized by having a linear density of 60 to 120 in a length of 50 μm of an arbitrary two-dimensional section has a three-point bending strength of 130 kg/mm$^2$ or more as measured according to JIS R 1601.

A silicon nitride ceramic comprises a crystal grain of silicon nitride and a grain boundary phase (a glass phase or a crystal phase or a mixed state of these phases) containing a sintering aid added thereto. The mechanical properties of silicon nitride have hitherto been discussed from the viewpoint of the crystal grain diameter alone, and a sintered body having a small crystal grain diameter has been believed to have excellent properties. The result of intensive studies conducted by the present inventors has revealed that even in a sintered body comprising a fine crystal grain, breaking in an grain boundary phase due to the segregation of the grain boundary phase, which cannot be evaluated by the mean grain diameter, and breaking from the abnormal grain growth portion attributable to the segregation of the grain boundary phase are an origin of the breaking, and the evaluation of the mechanical properties from the grain diameter alone is not always useful. For this reason, in the present invention, the development of a sintered body is conducted by a technique called "linear density" wherein two types of information, that is, the crystal grain diameter and the state of dispersion of the grain boundary phase in the structure of the sintered body, are quantified as opposed to a technique wherein only the crystal grain diameter is quantified, which contributes to an improvement in the mechanical properties.

FIG. 4 is a schematic diagram for evaluating the linear density of a crystal grain, which is an example wherein the linear density is 9 grains/50 μm. In this drawing, C stands for a crystal grain.

In order to improve the linear density of the crystal grain and, at the same time, to improve the productivity and cost efficiency, it is preferred that the crystal grain substantially constituting the sintered body comprise α-silicon nitride and β'-sialon. This is because when the crystal grain consists of a β-type columnar crystal grain of silicon nitride alone, no improvement in the linear density can be attained due to a steric hindrance, whereas the packing of a spherical α-silicon nitride crystal grain between β-type columnar crystal grains facilitates an improvement in the linear density.

The above-described concept, wherein the crystal phase of α-silicon nitride is combined with the crystal phase of columnar β-silicon nitride, is disclosed in, for example, Japanese Patent Laid-Open No. 91065/1986 and No. 44066/1990. In both cases, the crystal phase of α'-sialon represented by the general formula Mx (Si, Al)$_{12}$(O, N)$_{16}$ (wherein M represents Mg, Ca, Li or a rare earth element) is combined with the crystal phase of β'-sialon including β-silicon nitride, and the composition is mainly composed of a ternary system of $Si_3N_4$-AlN-MO (wherein MO represents MgO, $Y_2O_3$, CaO, etc.) and the ratio of addition of AlN to MO is limited to 1:9 in terms of percentage by mole. In this case, an improvement in the mechanical properties can be attained through the formation of a composite crystal phase comprising α'-sialon and β'-sialon (including β-silicon nitride). Further, as is apparent also from the examples, all the sintered bodies having a strength exceeding 100 kg/mm$^2$ in terms of the bending strength are produced by hot pressing. In these processes, no high strength characteristics cannot be consistently attained on a commercial scale.

The density of occurrence of the crystal grain of the α-silicon nitride in the sintered body and the crystal grain of the β'-sialon in the sintered body becomes important to the attainment of a significant effect of the present invention. Specifically, it is necessary that the linear density of the crystal grain be 60 to 120 per 50 μm in length of an arbitrary two-dimensional section in the sintered body. When the linear density is less than 60, the packing density of the crystal grain lowers when the crystal phases are combined, so that no sufficient effect of the crystal phase of α-silicon nitride on the strength can be expected. On the other hand, when the linear density exceeds 120, the content of the crystal grain of α-silicon nitride is so remarkably increased so that no sufficient effect of reinforcement exerted by the dispersion of the columnar crystal grain of β'-sialon can be expected. Further, in this case, there is such a problem of productivity that no sufficiently dense sintered body can be produced without remarkably reducing the amount of addition of the sintering aid or using a pressure sintering process such as a hot pressing process. Further, in order to sufficiently improve the effect of the present invention, it is preferred that the precipitation ratio of α-silicon nitride to β'-sialon in terms of the peak intensity ratio as determined by X-ray diffractometry be 0%< α-silicon nitride≦30% and 70%≦β'sialon <100%. When the precipitation ratio of the a-silicon nitride exceeds 30% and shifts on the high-α-$Si_3N_4$ side, the effect of the columnar crystal structure of β'-sialon is reduced, so that the effect of combining the crystal phases cannot be sufficiently exhibited and the effect of improving the strength is unsatisfactory.

In order to produce the sintered body of the present invention, it is preferred to use a method wherein use is made of a sintering aid capable of combining with $SiO_2$ present on the surface of silicon nitride to form a liquid phase at a temperature as low as possible, for example, a compound comprising Y and Al, i.e., a method which comprises adding a compound capable of combining with $SiO_2$ at a low temperature to form a liquid phase, i.e., a compound comprising Mg, Ce, Ca, La, Sr or the like, to the components comprising Y and Al and sintering the mixture at a temperature at or below 1650° C.

Regarding the sintering aids to be added, use of a commercially available fine powder or a fine powder passed through a sieve or a classifying device is preferred because it allows low-temperature sintering. Regarding the molding method, when starting raw material is made of a fine powder, it is preferred to use a wet molding method, such as slip casting, because moldability lowers by using a dry molding method. The use of these techniques enables sintering to be conducted at low temperature, which enables the linear density to be easily improved. Further, the occurrence of abnormal crystal grain and the segregation of the grain boundary phase derived from the segregation of the sintering aid can be reduced, so that variation in the strength characteristics can be remarkably reduced.

The sintering at low temperature serves to inhibit the deterioration in the properties of the sintered body derived from the growth of abnormal grains. Since silicon nitride undergoes sublimation and decomposition in a temperature region of 1700° C. or above in a nitrogen atmosphere under atmospheric pressure, it is necessary to conduct sintering in a nitrogen atmosphere under elevated pressure. For this reason, regarding the facilities, a batch sintering furnace has been used. By contrast, in the above-described sintering process wherein low-temperature sintering is possible, it becomes possible to conduct sintering with a high productivity through the use of an open continuous sintering furnace of pusher or belt type. Detailed description will now be described on this point. Gas pressure sintering in the so-called "batch sintering furnace" is mainly used as a sintering process for a silicon nitride material having excellent strength characteristics. In this system, a variation in the temperature distribution within the furnace or a lot-to-lot variation in the conditions necessarily occurs, so that this process is unsatisfactory as a process for stably providing ceramic materials for the mass production of parts. In this respect as well, the present invention which can improve the productivity as well is valuable from the industrial viewpoint.

In the above-described sintered body, a high strength can be stably attained when the Z value of β'sialon represented by the general formula $Si_{6-z}Al_zO_zN_{8-z}$ falls within the range 0<Z<1.0.

It is conceivable that the strength characteristics of the silicon nitride material are influenced by a wide variety of factors, such as the composition of a sintering aid and its relative density and the grain diameter and grain form (such as an aspect ratio) of silicon nitride sintered grains and factors which particularly affect the impact strength are not elucidated yet, so that a reliability sufficient for the application of the material cannot be attained. The present inventors have made intensive studies and, as a result, have found that the results of evaluation obtained by various known impact testing methods (such as charpy, Izod or drop-weight test) do not always correspond to the results of evaluation obtained by a practical impact property test (for example, a motoring test) and that the shock compressive elasticity limit (Hugoniot-elastic limit) is very useful as a value for evaluating the impact resistance of ceramic materials including a silicon nitride material and when the value is 15 GPa or more, the silicon nitride material has a particularly excellent impact resistance.

The shock compressive elasticity limit can be measured by known methods, and the measuring method is described in detail in, for example, the following document:

(1) The Nikkan Kogyo Shimbun, Ltd., "Shogeki Kogaku", 1988, Chapter. 8, pp. 227; and
(2) T. Mashimo, M. Kodama and K. Nagayama; Elasto-plastic Property under Shock Compression of CaO Doped Stabilized Zirconia Ceramics, Proc. 3rd Internat. Conf. Sci. Tech. Zirconia.

BEST MODE OF CARRYING OUT THE INVENTION

A starting material powder of silicon nitride having a mean grain diameter of 0.5 μm, a proportion of β-crystal phase of 96% and oxygen content of 1.4% by weight and powders of $Y_2O_3$, $Al_2O_3$, AlN and MgO respectively having mean grain diameters of 0.8 μm, 0.4 μm, 0.5 μm and 0.2 μm were subjected to wet mixing on a nylon ball mill in ethanol for 100 hr, and the mixture was dried to give a mixed powder, which was then subjected to CIP molding at 3000 kg/cm². The molding was subjected to primary sintering in a 1-atm nitrogen gas atmosphere at a temperature below 1750° C. for 5 to 10 hr. The resultant sintered body was subjected to secondary sintering in a 1000-atm nitrogen gas atmosphere at a temperature below 1750° C. for one hour.

A test piece having a size of 19 mm×19 mm×5 mm was cut out of the sintered body to provide a sample for measuring the shock compressive elasticity limit (Hugoniot-elastic limit), and the whole surface thereof was subjected to finish working with a #800 grinding diamond wheel.

Separately, a disk-shaped test piece having a size of 25 mmφ×3 mm was cut out of the sintered body to provide a sample for evaluating the practical performance. The upper and lower surfaces of the test piece were similarly subjected to finish working with a #800 grinding diamond wheel, and the circumferential portion thereof was chamfered off with a radius of 0.3 to provide a tappet shim.

Further, 15 flexural strength test pieces according to JIS R 1601 were cut out of the sintered body and applied to measurement of three-point bending strength.

Figure 1:
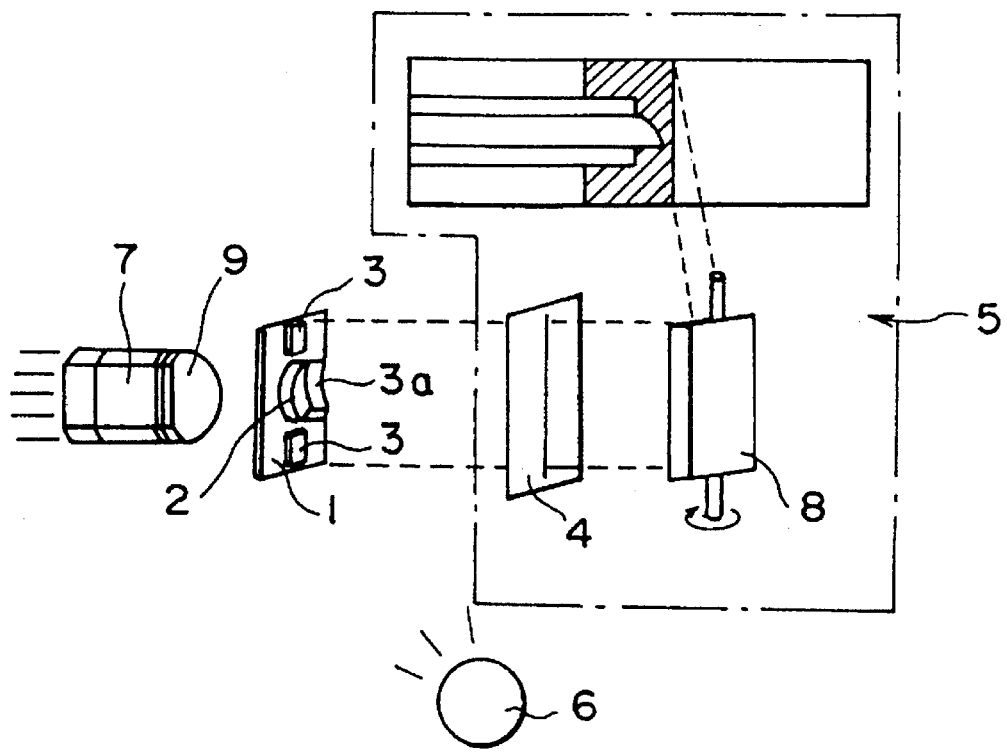
FIG. 1 is a diagram for illustrating the method of measuring a shock compressive elasticity limit (Hugoniot-elastic limit)

The shock compressive elasticity limit (Hugoniot-elastic limit) was measured by an inclined mirror method shown in FIG. 1.

In this method, a plane mirror is mounted on a driver plate 1 and a front surface mirror 3 and an inclined mirror 3a are mounted respectively on the front and the rear surfaces of the sample 2. The state of interruption of light from the mirror due to the turbulence of a metallized surface caused when an impact wave reaches the driver plate 1 and the rear face of the sample 2 or the free surface collides with the inclined mirror is recorded by means of a high-speed streak camera 5 through a slit 4. A xenon flash lamp is used as a light source 6, and a pulse signal from a logic circuit of a device for measuring the speed of a projectile 7 having a collision plate 9 is used as a trigger. A mirror rotating camera provided with a rotary mirror 8 is used in the high-speed streak camera 5. The speed of the projectile 7 is determined within an accuracy of 0.3% according to the light reflection or magnet flying method.

Figure 2:
FIG. 2 is an illustrative diagram of a finished product of a tappet shim.
Figure 3:
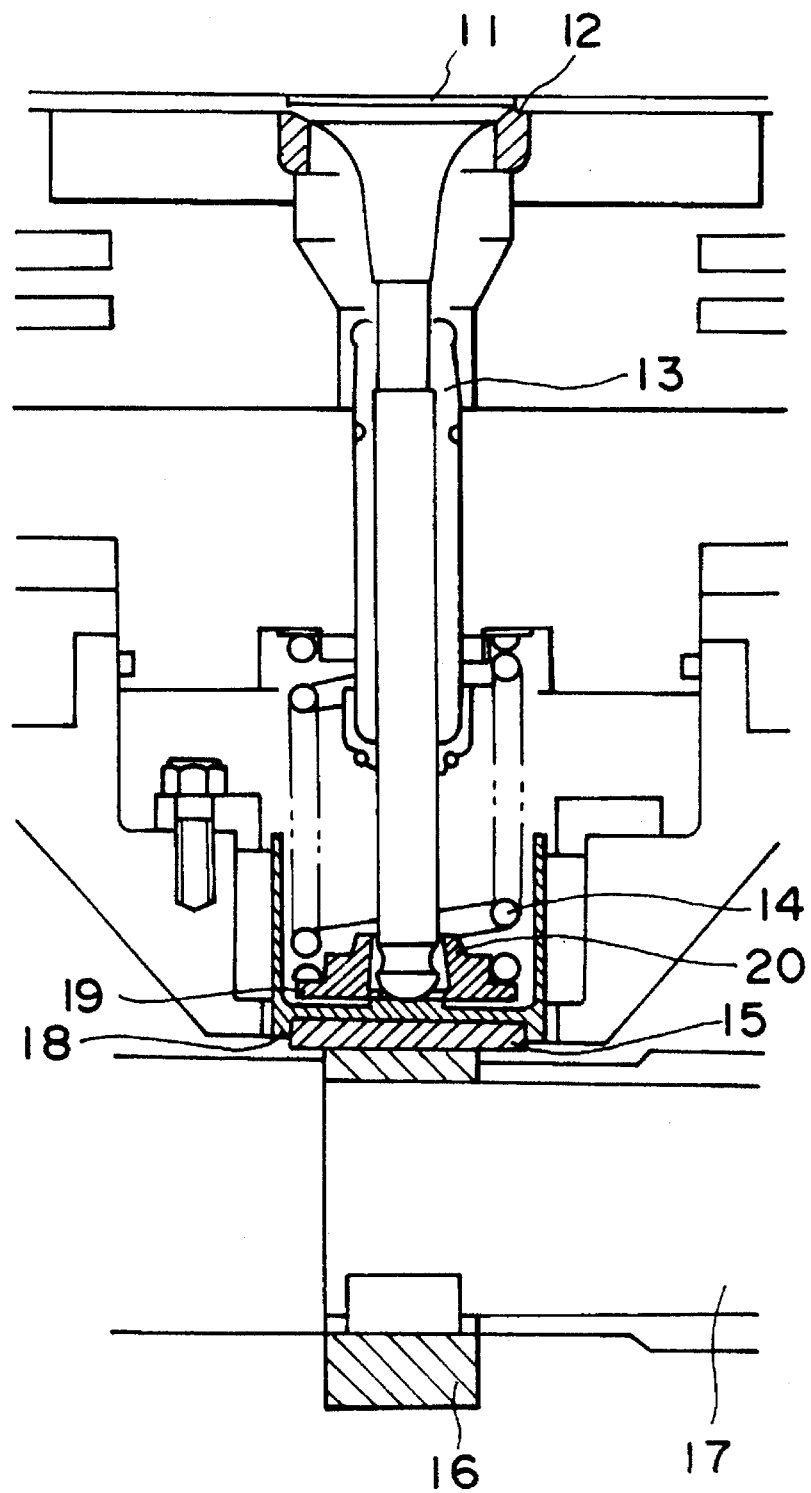
FIG. 3 is an illustrative diagram of a motoring device for evaluating the destruction limit of a shim.
Figure 4:
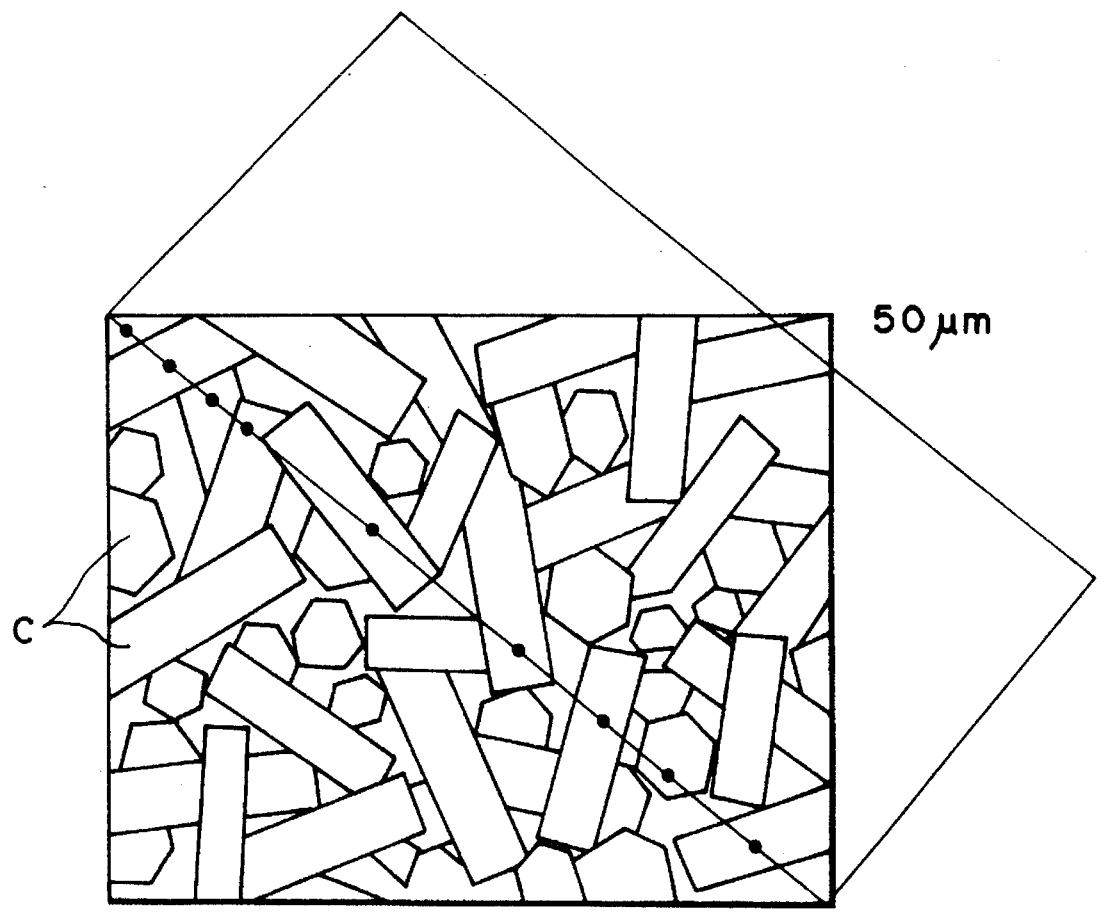
FIG. 4 is a schematic diagram for illustrating the linear density of a crystal grain.

FIG. 2 is a diagram of a finished product of a tappet shim. The tappet shim was evaluated in terms of the destruction limit of the shim against the number of revolutions of a cam in the motoring device shown in FIG. 3. In FIG. 3, the motoring device comprises a valve 11, a valve sheet 12, a valve guide 13, a valve spring 14, a tappet shim 15, a cam 16, a cam shaft 17, a valve lifter 18, a retainer 19 and a retainer rock 20. In this embodiment, use was made of a direct driving system wherein use was made of a cam. The rotational speed corresponds to twice the number of revolutions of the cam.

The results of evaluation are given in Table 1.

The proportion of the crystal phases given in the table was calculated from the peak intensity ratio of the $\alpha_1(102)$, $\alpha_2(210)$, $\beta_1(101)$ and $\beta_2(210)$ according to the equation: $\beta(\%)=(\beta_1+\beta_2)/(\alpha_{1+\alpha 2}+\beta_1+\beta_2)\times 100$. The linear density of the crystal grains was determined by chemically etching the ground surface of the sintered body with a mixture of HF and $HNO_3$, observing the structure under a scanning electron microscope (SEM) (magnification:×2000) and measuring the linear density per 50 μm in length at five places and determining the average of the measurements. Five sections were used for the measurement for each sintered body.

TABLE 1

| No. | Linear density of crystal grain | Proportion of crystal phases α/(α + β') | Three-point bending strength (kgf/mm²) | Z value | Shock compressive elasticity limit (GPa) | Number of revolutions necessary for destructing tappet shim (rpm) |
| --- | --- | --- | --- | --- | --- | --- |
| 1 | 64 | 0 | 135.2 | 0.8 | 15.8 | 4200 |
| 2 | 82 | 0 | 138.5 | 0.6 | 16.7 | 4350 |
| 3 | 90 | 5 | 145.3 | 0.2 | 16.9 | 4300 |
| 4 | 85 | 12 | 160.2 | 0.3 | 18.3 | 4450 |
| 5 | 103 | 20 | 154.6 | 0.3 | 20.3 | no destruction |
| 6 | 115 | 28 | 147.3 | 0.1 | 17.6 | 4350 |
| 7 | 53 | 0 | 103.5 | 1.2 | 11.2 | 4000 |
| 8 | 45 | 0 | 75.6 | 1.5 | 9.8 | 3750 |
| 9 | 55 | 3 | 88.6 | 1.2 | 14.5 | 3850 |
| 10 | 132 | 50 | 60.5 | 0.2 | 12.0 | 3500 |

Note) Nos. 7 to 10 are comparative examples.

EXAMPLE 2

A starting material powder of silicon nitride having a mean grain diameter of 0.8 μm, a proportion of α-crystal phase of 96% and an oxygen content of 1.4% by weight was subjected to wet mixing with powders of $Y_2O_3$, $Al_2O_3$, AlN and MgO, which had been subjected to wet classification, to remove secondary aggregated grains having a size of 10 μm or more, and the mixture was wet-molded into a molding. The molding was evaluated in the same manner as that of the Example 1. The Weilbull modulus was measured on 30 flexural strength test pieces. The results are given in Table 2.

TABLE 2

| No. | Linear density of crystal grain | Proportion or crystal phases α/(α + β') | Three-point bending strength (kgf/mm²) | Z value | Shock compressive elasticity limit (GPa) | Number of revolutions necessary for destructing tappet shim (rpm) | Weibull modulus in three-point bending strength |
|---|---|---|---|---|---|---|---|
| 1 | 105 | 15 | 165.2 | 0.2 | 20.5 | no destruction | 22.3 |
| 2 | 118 | 23 | 158.5 | 0.1 | 21.3 | no destruction | 25.0 |
| 3 | 98 | 5 | 145.3 | 0.2 | 16.9 | 4300 | 12.6 |
| 4 | 85 | 12 | 160.2 | 0.3 | 18.3 | 4450 | 15.4 |

Industrial Applicability

The silicon nitride sintered body according to the present invention is excellent not only in static strength but also particularly in impact strength, so that it can be applied to mechanical parts such as a tappet shim for a reciprocating engine and a valve train material such as an exhaust valve.

We claim:

1. A silicon nitride sintered body consisting essentially of a sintering aid and crystal grains having a linear density of 60 to 120 per 50 μm length, as measured in an arbitrary two-dimensional section of the sintered body, said crystal grains consisting essentially of α-silicon nitride and β'-sialon represented by the formula $Si_{6-z}Al_zO_zN_{8-z}$, wherein $0<Z<1.0$, said α-silicon nitride being present in an amount not exceeding 30% and an amount of β'-sialon being 70% to less than 100%, in terms of peak intensity ratio, as determined by X-ray diffractometry.

2. A silicon nitride sintered body consisting essentially of a sintering aid and crystal grains having a linear density of 60 to 120 per 50 μm length, as measured in an arbitrary two-dimensional section of the sintered body, said crystal grains consisting essentially of β'-sialon represented by the Formula $Si_{6-z}Al_zO_zN_{8-z}$, wherein Z is greater than 0 and less than 1.0, said sintered body having a shock compressive elasticity limit (Hugoniot-elastic limit) of at least 20 GPa, a three-point bending strength of at least 150 kg/mm² and a Weibull modulues of at least 20.

* * * * *